Aug. 4, 1925.
J. P. BODDIGER
1,548,251
CORN PLANTER ATTACHMENT
Filed Dec. 11, 1923
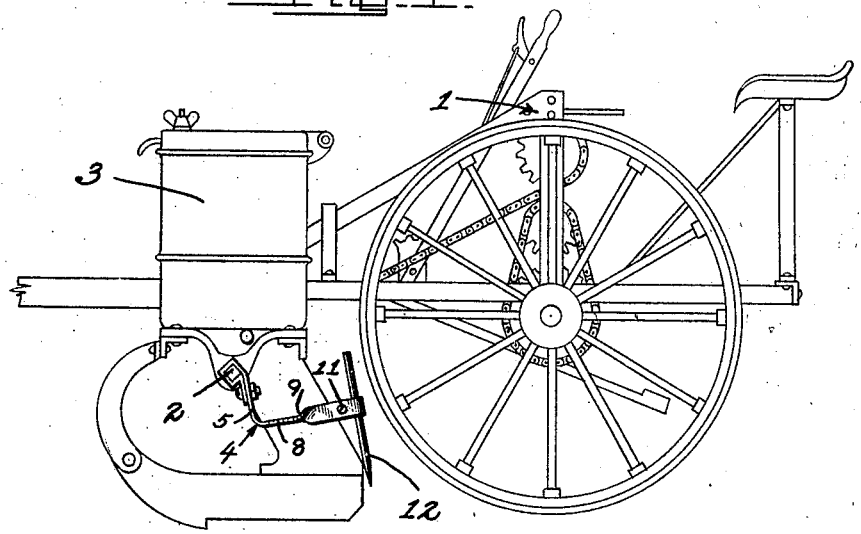
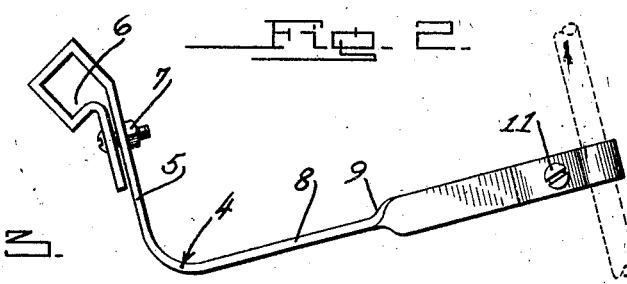
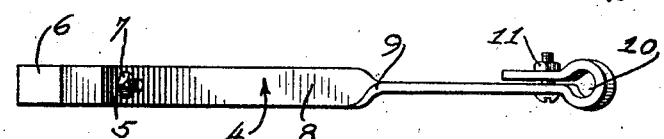
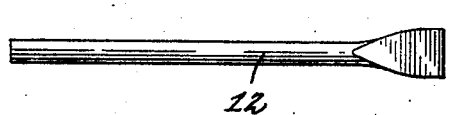
Inventor
John P. Boddiger
By Jacobi & Jacobi
Attorneys Patented Aug. 4, 1925.

1,548,251

UNITED STATES PATENT OFFICE.

JOHN P. BODDIGER, OF POLO, ILLINOIS.

CORN-PLANTER ATTACHMENT.

Application filed December 11, 1923. Serial No. 679,998.

*To all whom it may concern:*

Be it known that JOHN P. BODDIGER, a citizen of the United States, residing at Polo, in the county of Ogle and State of Illinois, has invented certain new and useful Improvements in Corn-Planter Attachments, of which the following is a specification.

This invention relates to new and useful improvements in corn planter attachments, and more particularly to a marking attachment therefor, the primary object of the invention being to provide an angularly formed spring metal arm attachable to the rock shaft of the corn planter and capable of adjustment and ready removal therefrom, the arm being constructed to adjustably and removably secure the marker at its free end.

A further object is to provide a marker attachment of the above mentioned character, which is simple in construction, inexpensive, strong and durable and further well adapted for the purposes for which it is designated.

Other objects and advantages of this invention will become apparent during the course of the following description.

In the accompanying drawing forming a part of this specification and in which like numerals designate like parts throughout the same,—

Figure 1 is a side elevation of a corn planter showing my attachment in position thereon.

Figure 2 is an enlarged detail side elevation of the supporting member.

Figure 3 is a top plan view thereof, and

Figure 4 is a detail view of the marking element.

In the drawing wherein for the purpose of illustration is shown the preferred embodiment of my invention, the numeral 1 designates generally a corn planter of the well known construction, and the rock shaft thereof is designated by the numeral 2. The numeral 3 designates a seed box of the usual or any preferred character with which the rock shaft 2 cooperates.

Adapted to be associated with the rock shaft 2 of the corn planter 1 is a marker designated generally by the numeral 4. This marker is constructed of a single strip of metal of a suitable length and is bent intermediate its ends to provide a substantially L-shaped supporting member as is clearly illustrated in Figs. 1 and 2 of the drawing. The shorter arm 5 of the L-shaped supporting member has a loop 6 formed at its outer free end such as is shown in Fig. 2 of the drawing, and this loop 6 is substantially rectangular for the purpose of permitting the same to properly engage the rectangular portion of the rock shaft 2. This construction will prevent the possibility of the supporting member from becoming inoperative as the rock shaft 2 operates and in order to securely hold the loop portion 6 of the supporting member in position on the outer end of the shaft, I have provided the clamping means shown at 7 in the drawing. The clamping means comprises a bolt and a nut which cooperate in such a manner as to cause the loop portion formed on the outer free end of the shorter arm 5 to be secured on the shaft 2. It is to be understood that by loosening the clamping means 7 the supporting member 4 may be easily and quickly removed from the seed actuating shaft whenever desired.

The longer arm 8 of the supporting member 4 is twisted intermediate its ends as shown at 9 in the drawing and the outer free end of the longer arm 8 is also provided with a loop 10. Suitable clamping means 11 being associated with the loop portion for permitting the loop to detachably and adjustably support the marking element 12, which is more clearly illustrated in Figs. 1 and 4 of the drawing. The purpose of having the longer arm 8 of the supporting member twisted is to dispose the loop 10 formed at the outer free end thereof at substantially right angles to the loop 6 formed at the free end of the shorter arm 5, whereby the marking element 12 will be supported in an operative position when the device is in use.

By constructing the marker of spring metal, the same may be bent at any predetermined angle in order to meet the desired arrangement and furthermore the marking element 12 can be vertically adjusted and supported in its adjusted position in the outer end of the longer arm of the marker in such a manner as to render the same positive in its operation at all times.

In use, the device is placed in position on the rock shaft so that the loop portion 6 will be securely supported on the outer free end thereof and the marking element 12 will be properly supported in the loop 10. As the rock shaft operates in a manner well known in the art, the marking element 12 will come in contact with the ground and will mark the place where the seed has been dropped from the seed box 3.

From the foregoing description of the construction of my improved apparatus, it will be seen that I have provided a simple, inexpensive and efficient means for carrying out the objects of the invention, and while I have particularly described the elements best adapted to perform the functions set forth, it is obvious that various changes in form, proportion, and in the minor details of construction may be resorted to, within the scope of the appended claim without departing from the spirit or sacrificing any of the principles of the invention.

Having thus described my invention, what I claim as new and desire to secure by Letters Patent is:—

In a device of the class described, the combination with a rock shaft, of a marker comprising a single strip of metal bent intermediate its ends to provide a substantially L-shaped supporting member, the shorter arm thereof having a rectangular loop formed on its free end for engagement with said rock shaft, clamping means on said loop for securely fastening the loop to said rock shaft, the longer arm being twisted, said twisted portion having a second loop formed at its free end, and clamping means at its end, the second loop being disposed at substantially right angles to the first mentioned loop, and a marking element adjustably and removably supported in said second mentioned loop, substantially as described.

In testimony whereof I affix my signature.

JOHN P. BODDIGER.